(12) United States Patent
Watts

(10) Patent No.: US 9,569,168 B2
(45) Date of Patent: Feb. 14, 2017

(54) AUTOMATIC RATE CONTROL BASED ON USER IDENTITIES

(71) Applicant: TiVo Inc., Alviso, CA (US)

(72) Inventor: Robert Watts, Gilroy, CA (US)

(73) Assignee: TiVo Inc., San Jose, CA (US)

( * ) Notice: Subject to any disclaimer, the term of this patent is extended or adjusted under 35 U.S.C. 154(b) by 8 days.

(21) Appl. No.: 14/203,404

(22) Filed: Mar. 10, 2014

(65) Prior Publication Data

US 2014/0277653 A1 Sep. 18, 2014

Related U.S. Application Data

(60) Provisional application No. 61/777,959, filed on Mar. 12, 2013.

(51) Int. Cl.
*G06F 17/00* (2006.01)
*G06F 3/16* (2006.01)

(52) U.S. Cl.
CPC .................................... *G06F 3/165* (2013.01)

(58) Field of Classification Search
CPC ........................... G06F 3/165; H04N 21/8106
See application file for complete search history.

(56) References Cited

U.S. PATENT DOCUMENTS

| 6,038,199 | A  | * | 3/2000 | Pawlowski et al. | 369/29.02 |
| 6,505,153 | B1 | * | 1/2003 | Van Thong et al. | 704/211 |
| 2003/0046080 | A1 | * | 3/2003 | Hejna, Jr. | 704/270 |
| 2007/0223873 | A1 | * | 9/2007 | Gilbert et al. | 386/68 |
| 2013/0031266 | A1 | * | 1/2013 | Gilson | 709/232 |
| 2014/0277652 | A1 |   | 9/2014 | Watts | |

OTHER PUBLICATIONS

United States Patent and Trademark Office, U.S. Appl. No. 14/203,391, Non-Final Office Action dated Jun. 19, 2015.
United States Patent and Trademark Office, U.S. Appl. No. 14/203,391, Final Office Action dated Dec. 10, 2015.
United States Patent and Trademark Office, U.S. Appl. No. 14/203,391, Non-Final Office Action dated Apr. 21, 2016.

\* cited by examiner

*Primary Examiner* — Joseph Saunder, Jr.
(74) *Attorney, Agent, or Firm* — Wong & Rees LLP; Zhichong Gu

(57) ABSTRACT

Input media data with an input playing speed is received. One or more user identities are identified based at least in part on biometric data collected from one or more users who correspond to the one or more user identities and to whom audio utterance derived from the input media data is to be played. A preferred rate of audio utterance is determined based at least in part on the one or more user identities. A rate of audio utterance is determined for a portion of the input media data. Based at least in part on the preferred rate of audio utterance and the rate of audio utterance, a portion of audio output media data is generated with an output playing speed at which audio utterance in the portion of audio output media data is rendered with the preferred rate of audio utterance.

21 Claims, 9 Drawing Sheets

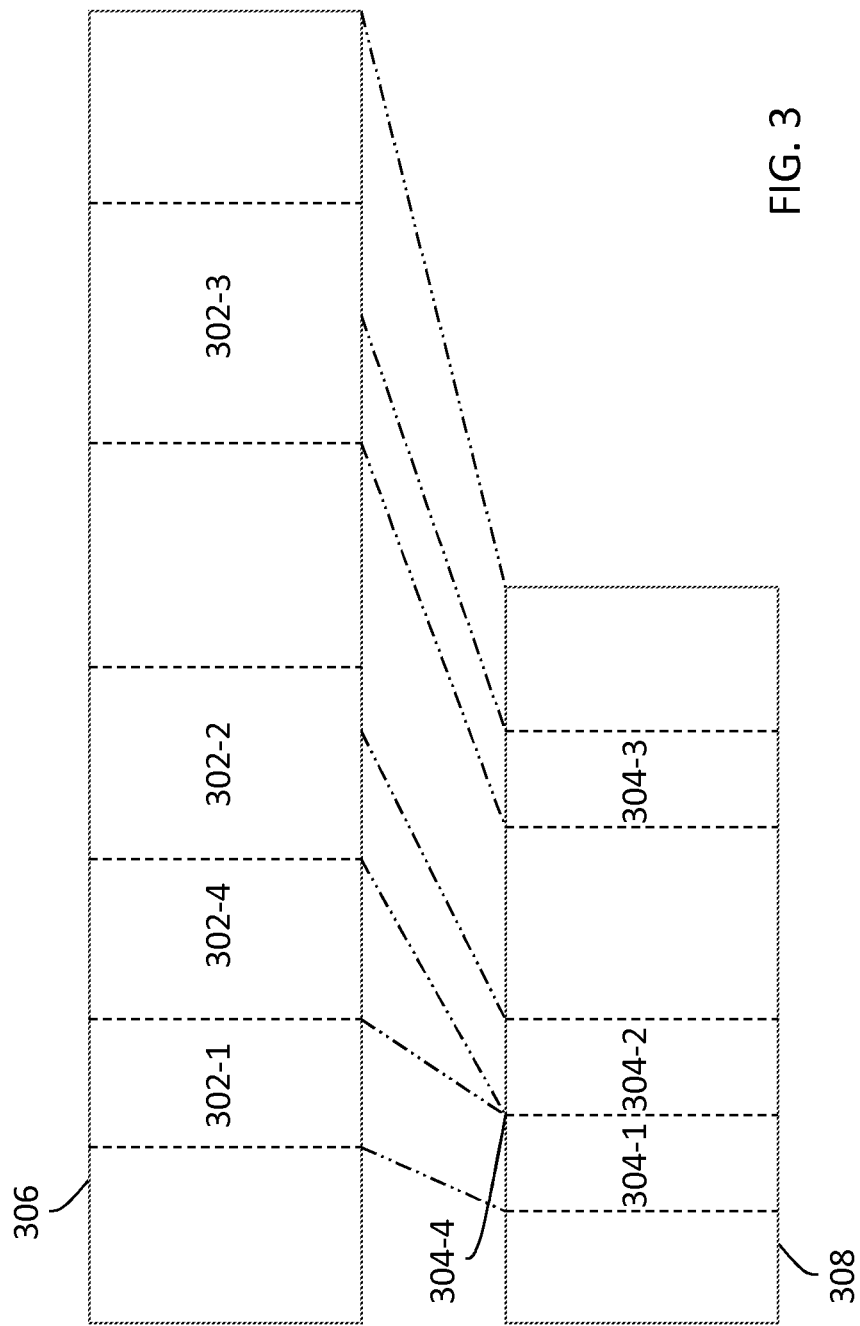

AUTOMATIC RATE CONTROL BASED ON USER IDENTITIES

PRIORITY CLAIM

This application claims priority of Provisional Application Ser. No. 61/777,959, filed Mar. 12, 2013, the entire contents of which are hereby incorporated by reference as if fully set forth herein, under 35 U.S.C. §120.

FIELD OF THE INVENTION

The present invention relates to processing media data with audio content. Specifically, the invention relates to automatically adjusting playing speeds of media data based on user identities.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A user may select a particular playing speed from a range of speed values when playing an audio signal. For example, given a range of 1.1× to 2.0× a normal playing speed (with no repeating, no skipping, no forwarding, no rewinding, no pause, etc.), a user may select a speed of 1.5× the normal playing speed to play a particular audio signal. Digital signal processing (DSP) algorithms may be used to playing the audio signal at the selected fast forward speed without affecting pitches in the audio signal. Selected speeds may or may not be adequate, as different users have different levels of audio intelligibility with respect to a variety of possible audio sources.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates example automatic rate control in accordance with one or more embodiments;

DETAILED DESCRIPTION

Figure 1:
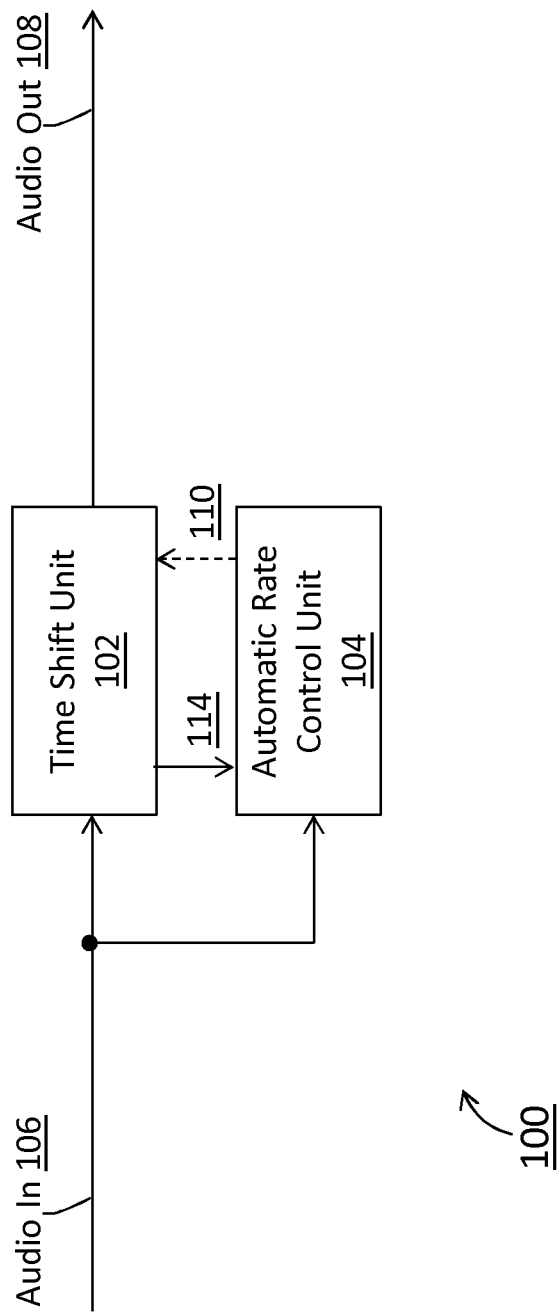
FIG. 1 and FIG. 2 illustrate examples systems in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
    2.0 SYSTEM ARCHITECTURE
        2.1 EXAMPLE AUDIO SYSTEM
        2.2 EXAMPLE MULTIMEDIA SYSTEM
    3.0 AUTOMATIC RATE CONTROL
    4.0 EXAMPLE MULTIMEDIA DEVICE
    5.0 EXAMPLE EMBODIMENTS
    6.0 HARDWARE OVERVIEW
    7.0 EXTENSIONS AND ALTERNATIVES

1.0 Functional Overview

Techniques for automatic rate control based on biometric data analysis as described herein may be implemented in software components, hardware components, or a combination of software and hardware components. To reduce costs, one or more media or audio processing operations under these techniques may be implemented and/or performed by one or more of commercially or non-commercially available speech recognition algorithms/processors, pitch correction algorithms/processors (e.g., simple overlap add, or SOLA), digital signal processing algorithms/processors, media codecs, graphics processors, ASICs, FPGAs, etc., with further derivation, enhancement, improvement and integration.

In some embodiments, a system comprises one or more media/audio processing programs/components that implement the automatic rate control techniques as described herein. The system may be a media processing system such as a television, a software program, a downloadable desktop or mobile application, a voice mail application, a server, a PC, an electronic book reader, a handheld device, a set-top box, a DVR, a distributed system that combines one or more of PCs, tablet computers, etc. Such a system may be configured with one or more user interface components— e.g., server-based, web-based, with a DVR or a computing device such as iPad, GUI-based, text-based, button-based, icon-based, pointer-based, pen-based, gesture-based, motion-based, remote control devices, mobile devices, etc.—to receive user input that specifies a preferred rate of audio utterance. The preferred rate of audio utterance may be associated with one or more specific audio utterance units (e.g., sentences, words, syllables, etc.). A user may set a value for the preferred rate of audio utterance from a list of discrete values, a continuous value range, a combination of discrete values or continuous value ranges, etc. The user is free to select a value for the preferred rate of audio utterance that corresponds to the user's level of audio intelligibility.

The system may be configured to vary the playing speed (e.g., slow playing, fast playing, normal playing, etc.) of different portions of media (or audio) data so that the different portions of media data are played at the same preferred rate of audio utterance in terms of the specific audio utterance units (e.g., sentences, words, syllables, etc.), while maintaining correct pitches in the different portions of media data.

The system may be configured to provide one or more user interface components (e.g., a slider, buttons on a remote control device, voice command functionality, etc.) to allow a user to continuously or discretely adjust values (e.g., 2.5 syllables per second) of the preferred rate of audio utterance in order to locate a particular value that corresponds to a comfortable/preferred level of audio intelligibility to the user. Once set, different media or audio data portions that comprise the specific audio utterance units (e.g., syllables, words, sentences, another audio content metric, etc.), even different audio portions with different rates of audio utterance, may be rendered at the preferred rate of audio utterance in a pitch-correct manner, in accordance with the user's level of audio intelligibility.

In some embodiments, a preferred rate of audio utterance is saved along with a respective user's identification information in a data store (e.g., a reference data store, a user identification data store, etc.). The preferred rate of audio utterance and the respective user's identification information may be associated (e.g., through a look-up relationship, a hash table, etc.) in the data store. In some embodiments, one or more data stores may be used to store preferred rates of audio utterance, respective users' identification information, and associations between the preferred rates of audio utterance and the respective users' identification information.

Users' presences or user identities may be detected based at least in part on biometric data collected from the users in real time, or substantially in real time. For example, biometric data comprising one or more of one or more users' facial images, one or more users' voices, one or more users' fingerprints, etc., may be collected from a location (a room where a media device is located, a place where a high-end television is located, etc.). Biometric data can be biological-based, physiological-based, behavioral-based, etc. Examples of biometric data include, but are not limited to only, fingerprint, face recognition, palm print, hand geometry, iris recognition, retina, a person's voice, etc. The biometric data may be compared with identification information in the data store for the purpose of determining the one or more users' presences or one or more user identities corresponding to the users at the location.

A specific preferred rate of audio utterance may be determined based at least in part on the user identities as identified through the collected biometric data, and used to adjust the media playing speed, so that audio in input media data is rendered at the specific preferred rate of audio utterance. In some embodiments, a preferred rate of audio utterance may be determined for each of the users identified through the collected biometric data. As a result, different preferred rates of audio utterance may be obtained. A lowest, a medium, an average, etc., of the preferred rates of audio utterance may be used for the purpose of setting/selecting a specific preferred rate.

The process of determining user identities, determining a specific preferred rate of audio utterance, and rendering media data based on the specific preferred rate of audio utterance, as mentioned above, may be repeated from time to time, for example, periodically, every few minutes, every time when a user is leaving or entering the location at which the media data is being rendered, etc.

Techniques as described herein may be used to solve the problems associated with a fixed speed of playing media data under other approaches. In these other approaches, a user may select a fixed playing speed value (e.g., 1.5× of the media recording speed) to play all portions of the media data until a next selection is manually made. As a result, the media data that features slow speakers such as Henry Kissinger may be played too slowly relative to the user's level of audio intelligibility, while the media data that features faster speakers such as a FOX Newscast member may be played too fast relative to the user's level of audio intelligibility.

2.0 System Architecture

Although a specific computer architecture is described herein, other embodiments of the invention are applicable to any architecture that can be used to perform the functions described herein.

2.1 Example Audio System

FIG. 1 illustrates a system (100) in accordance with an embodiment. Although a specific system is described, other embodiments are applicable to any system that can be used to perform the functionality described herein. Components of the system (100) may be connected by, for example, a data bus, a data link, a Local Area Network (LAN), Wide Area Network (WAN), the Internet, Intranet, Extranet, etc. Alternatively, additionally, or optionally, any number of devices within the system (100) may be directly connected to each other through wired or wireless communication segments.

In an embodiment, the system (100) includes a time shift unit (102) and an automatic rate control unit (104). One or more components described within system (100) may be combined together in a single device or divided among several operatively linked discrete devices. Each of these components are presented to clarify the functionalities described herein and may not be necessary to implement the invention. Furthermore, components not shown in FIG. 1 may also be used to perform the functionalities described herein. Functionalities described as performed by one component may instead be performed by another component.

In an embodiment, the time shift unit (102) generally represents any device which is configured to receive input audio signal (106) comprising a plurality of input audio data units that may be divided into multiple input audio data subsets based on acoustic analytical results of the input audio data units, to receive automatic rate control information (110), which may be provided by the automatic rate control unit (104), and to generate, based at least in part on (1) the multiple input audio data subsets and (2) the automatic rate control information (110), output audio signal (108) comprising a plurality of output audio data units in multiple output audio data subsets that correspond to the multiple input audio data subsets. As used herein, the term "subset" refers to a portion of media (or audio) data in any of a wide variety of forms based on standards and/or proprietary specifications.

In some embodiments, the time shift unit (102) is further configured to receive acoustic analytical results related to the multiple input audio data subsets in the plurality of input audio data units. The plurality of output audio data units may be generated based at least in part on (1) the multiple input audio data subsets, (2) the acoustic analytical results and (3) the automatic rate control information.

In some embodiments, the time shift unit (102) is further configured to provide audio processing states (114) to the automatic rate control unit (104). The audio processing states (114) may include, without limitation, an indicator of a current position (e.g., a timestamp, a unit identifier, a frame number, a sequence number, a data block index, etc.) within the input audio signal (106); input audio data units preceding the current position have been processed by the time shift unit (102). Additional information relating to one or more audio processing operations performed by the time shift unit (102) may also be provided to the automatic rate control unit (104) as a part of the audio processing states (114).

The acoustic analytical results may be received or retrieved from an external data source, an internal data source, etc. In an example, the acoustic analytical results may be obtained from index files, index data structures, etc., received with the input audio data units (e.g., retrieved with audio files containing the input audio data units, etc.). In another example, the acoustic analytical results may be obtained from tags retrieved with audio streams containing the input audio data units, etc.). An index file, an index data structure, a tag, etc., may be generated beforehand, for example, by a server that has analyzed the input audio data. Additionally, optionally, or alternatively, the acoustic analytical results may be from an internal source that analyzes the input audio data units as received and generates the acoustic analytical results related thereto in real time, near real time, or at a rate faster than the real time rendering of the input media data. In some embodiments, the automatic rate control unit (104) may be configured to provide the acoustic analytical results to the time shift unit (102) as a part of or in addition to the automatic rate control information (110).

An input audio data unit as described herein may comprise a whole or a part of audio data for a specific time quantum (e.g., in milliseconds, tens of milliseconds, hundreds of milliseconds, seconds, tens of seconds, etc.) in accordance with a standard or proprietary specification that governs the input audio data unit. The specific time quantum may be associated with a specific sampling rate in accordance with the standard or proprietary specification. The input playing speed may refer to a specific playing speed at which the input audio data units are to be used to generate a whole or a part of sound waves for (e.g., successive) time durations respectively equaling to specific time quanta for which the input audio data units comprise audio data in accordance with the standard or proprietary specification.

If the input audio data units are recorded from live audio recording, the input playing speed may be the same as the recording speed associated with an audio sampling rate used at the live audio recording. On the other hand, if the input audio data units are not from live audio recording, the input playing speed may be different from the recording speed associated with an audio sampling rate used at the live audio recording.

Likewise, an output audio data unit as described herein may comprise a whole or a part of audio data for a specific time quantum (e.g., in milliseconds, tens of milliseconds, hundreds of milliseconds, seconds, tens of seconds, etc.) in accordance with a standard or proprietary specification— which may or may not be the same as the standard or proprietary specification that governs the input audio data units—that governs the output audio data unit. The output playing speed may refer to a specific playing speed at which the output audio data units are to be used to generate a whole or a part of sound waves for (e.g., successive) time durations respectively equaling to specific time quanta for which the output audio data units comprise audio data in accordance with the standard or proprietary specification.

Without loss of generality, a non-input playing speed such as an output playing speed of the output audio data as described herein may be represented as a relative quantity to the input playing speed, for example, as a ratio to the input playing speed; the change such as speeding up or slowing down may be represented as a multiplicative factor, for example, 1.1×, 1.5×, 2.0×, etc. that relates the input playing speed to the output playing speed. Thus, an input playing speed as described herein may be set as a constant value such as 1 (as measured by or relative to the input playing speed itself). The output playing speed may be relatively measured in relation to the input playing speed, for example, as a ratio (e.g., 1.1, 1.5, 2.0, etc.) to the input playing speed.

In some embodiments, an input audio data subset in the multiple input audio data subsets may be mapped or resampled by the time shift unit (102) to an output audio data subset in the multiple output audio data subsets. The input audio data subset may comprise one or more input audio data units, whereas the (corresponding) output audio data subset may comprise zero or more output audio data units. Relative to the input playing speed (e.g., 1) for an input audio data subset, the output playing speed for a corresponding output audio data subset may be any of slower speeds (e.g., 0.8, 0.9, etc.), the same speed (e.g., 1.0), or the faster speeds (e.g., 1.1, 1.5, 2.0, infinite, etc.).

The system (100) may be configured to accept user input that specifies a preferred rate of audio utterance. Examples of preferred rates of audio utterance may be, without limitation, based on a sentence rate, a spoken word rate, a syllable rate, etc. A preferred rate of audio utterance differs from user input that directly specifies a value for the output playing speed.

A user input that specifies a value for the output playing speed, for example, 1.5× the input playing speed does not indicate any rate of audio utterance as the underlying audio content may contain voices of a slow or faster speaker. The user input that specifies a fixed value of playing speed also enables an audio processing system to directly set the output playing speed accordingly without the acoustic analytical results of the input audio data units.

In sharp contrast, given user input that specifies a preferred rate of audio utterance, the system (100) may not be able to set the output playing speed without acoustic analytical results of the input audio data units. Only by incorporating the acoustic analytical results, is the system (100) able to determine individual values for the output playing speed for different output audio data subsets.

Under techniques as described herein, the output playing speed for an output audio data subset may be determined as a function of audio content in a corresponding input audio data subset that gives rise or corresponds to the output audio data subset. For example, an individual value for the output playing speed for an individual output audio data subset may be determined as a function of the number of sentences, words, syllables, etc., in a corresponding individual input audio data subset that gives rise or corresponds to the output audio data subset.

In some embodiments, at least two of the multiple output audio data subsets may be automatically rate controlled to be played at different values for the output playing speed. For example, a first output audio data subset of the at least two of the multiple output audio data subsets may be automatically played at a first value (e.g., 1.1) for the output playing speed, without user input specifying the first value as the output playing speed. A second different output audio data subset of the at least two of the multiple output audio data subsets may be automatically played at a second different value (different from the first value, e.g., 1.2 instead of a fixed value 1.1) for the output playing speed, without user input specifying the second value as the output playing speed.

The multiple input audio data subsets may have certain (input) pitches at an input playing speed. For example, a first input audio data subset may comprise a first voice with a first pitch, whereas a second different input audio data subset may comprise a second different voice with a second pitch different from the first pitch.

The time shift unit (102) may be configured to generate output audio data units in the multiple output audio data subsets in such a way that the input pitches in the multiple input audio data subsets corresponding to the multiple output audio data subsets are maintained in the output audio data units. Additionally, optionally, or alternatively, the time shift unit (102) may be configured to generate output audio data units in the multiple output audio data subsets in such a way that output pitches in the output audio data units may be limited to values in a range around, adjacent to, or a scaling factor of, the input pitches in the multiple input audio data subsets corresponding to the multiple output audio data subsets. As a result, the pitch quality as rendered may be perceptually the same or similar between the input audio signal (106) and the output audio signal (108).

In the current example, in a first output audio data subset that correspond to the first input audio data subset comprising the first voice with the first pitch, even though the first output audio data subset may be played at a first value (e.g., 1.5) of the output playing speed different from that (e.g., 1) of the input playing speed, sound waves rendered from the output audio data subset at the first value of the output playing speed may comprise a pitch that is the same as, or substantially similar to (e.g., within a particular relative range of), the first pitch of the first voice in the first input audio data subset played at the input playing speed (e.g., 1). Likewise, in a second output audio data subset that correspond to the second input audio data subset comprising the second voice with the second pitch, even though the second output audio data subset may be played at a second different value (e.g., 1.8 instead of 1.5) of the output playing speed different from that of the input playing speed (e.g., 1), sound waves rendered from the second output audio data subset at the second value of the output playing speed may comprise a pitch that is the same as, or substantially similar to (e.g., within a particular relative range of), the second pitch of the second voice in the second input audio data subset played at the input playing speed.

In an embodiment, the automatic rate control unit (104) generally represents any device configured to provide automatic rate control information (110) to the time shift (102). In some embodiments, the automatic rate control unit (104) is further configured to receive the input audio signal (106) comprising the plurality of input audio data units, to generate acoustic analytical results by analyzing the plurality of input audio data units in the input audio signal (106), and to provide acoustic analytical results of the input audio signal (106) to the time shift unit (102). The acoustic analytical results may be provided with, or as a part of, automatic rate control information (110) to the time shift unit (102). In some embodiments, the automatic rate control unit (104) is further configured to receive the audio processing states (114) from the time shift unit (102).

In some embodiments, the automatic rate control unit (104) may be configured to analyze (real time or non-real time) the audio content in the input audio signal (106) for the purpose of generating the acoustic analytical results. However, as discussed, in some embodiments, the acoustic analytical results may be received from an external or internal data source; thus, the acoustic analytical results may or may not be received with the input audio data units in the same input signal.

As used herein, the term "audio content" or "audio utterance units" refers to perceptual audio utterance units relating to one or more of human voices, natural languages, lyrics, rhythms, tempos, pitches, music notes, sounds emitted from humans, physical objects, creatures, plants, acoustic instruments, mountain springs, ocean waves, winds, storms, etc., when media (or audio) data that possesses the audio content or audio utterance units is rendered. Examples of audio utterance units include but are not limited to: sentences, syllables, words, etc.

In some embodiments, the automatic rate control unit (104) may be configured to determine the presence of one or more specific perceptual audio utterance units in an individual portion, or a whole of, the audio content in the input audio signal (106) as a part of analyzing the input audio data units.

Additionally, optionally, or alternatively, the automatic rate control unit (104) may be configured to determine an input rate of audio utterance relating to one of the one or more specific perceptual audio utterance units for example at the input playing speed when the input audio data units are played at the input playing speed (e.g., 1). For example, the automatic rate control unit (104) may be configured to determine the presence of audio content relating to a natural language, and proceed to determine an input rate of audio utterance for the natural language in the audio content when the input audio data units are played at the input playing speed. Examples of rates of audio utterance include, without limitation, a sentence rate (e.g., a rate of audio utterance for sentences), a phrase rate (e.g., a rate of audio utterance for phrases), a word rate (e.g., a rate of audio utterance for words), a syllable rate (e.g., a rate of audio utterance for syllables), a vowel rate (e.g., a rate of audio utterance for vowels), a consonant rate (e.g., a rate of audio utterance for consonants), a tone rate (e.g., a rate of audio utterance for tones), etc.

Based on the input rate of audio utterance determined in the audio content in the input audio signal (106), the automatic rate control unit (104) may be configured to divide the plurality of input audio data units in the input audio signal (106) into the previously mentioned multiple input audio data subsets. For example, input audio data units in a portion of the audio content with a first input rate of audio utterance may form a first input audio data subset, while other input audio data units in another portion of the audio content with a second input rate of audio utterance may form a second input audio data subset.

An input audio data subset may comprise one, two, three, or more audio data units. An input audio data subset may comprise a fixed number of audio data units in some implementations and may comprise a variable number of audio data units in some other implementations.

In some embodiments, the automatic rate control unit (104) may be configured to take into consideration the above-mentioned preferred rate of audio utterance and/or an average input rate of audio utterance in the audio content of the input audio signal (106) in dividing the plurality of input audio data units in the input audio signal (106) into the previously mentioned multiple input audio data subsets. In an example, the more different the preferred rate of audio utterance and the average input rate of audio utterance are, the larger the number of input audio data subsets used to divide the plurality of input audio data units in the input audio signal (106). In another example, the less different the preferred rate and the average input rate of audio utterance are, the larger the number of input audio data subsets used to divide the plurality of input audio data units in the input audio signal (106). Determinations of how different the rates of audio utterance are may be based on ratios, differences, etc., between the rates, and/or system or user configurable thresholds.

2.2 Example Multimedia System

Figure 2:
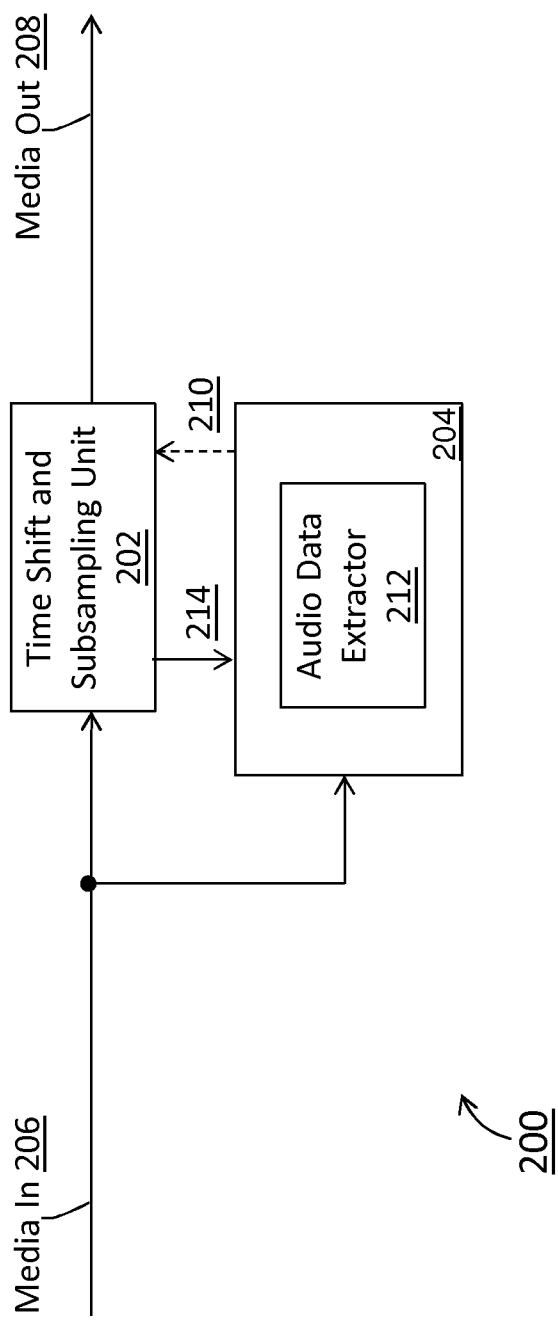

FIG. 2 illustrates a system (200) in accordance with an embodiment. In an embodiment, the system (200) includes a time shift unit (202) and an automatic rate control unit (204). One or more components described within system (200) may be combined together in a single device or divided among several operatively linked discrete devices.

In an embodiment, the time shift unit (202) generally represents any device which is configured to receive input media signal (206) comprising a plurality of input media data units, to divide the input media data units into multiple input media data subsets based on acoustic analytical results of the input media data units, to receive automatic rate control information (210), and to generate, based at least in part on (1) the multiple input media data subsets and (2) the automatic rate control information (210), output media signal (208) comprising a plurality of output media data units in multiple output media data subsets that correspond to the multiple input media data subsets.

In some embodiments, the time shift unit (202) is further configured to receive acoustic analytical results related to the multiple input media data subsets in the plurality of input media data units. The plurality of output media data units may be generated based at least in part on (1) the multiple input media data subsets, (2) the acoustic analytical results and (3) the automatic rate control information (210).

The acoustic analytical results may be received or retrieved from an external data source, an internal data source, etc. In an example, the acoustic analytical results may be obtained from index files, index data structures, etc., received with the input media data units (e.g., retrieved with media files containing the input media data units, etc.). In another example, the acoustic analytical results may be obtained from tags received with media streams containing the input media data units, etc. Additionally, optionally, or alternatively, the acoustic analytical results may be from an internal source that analyzes audio data and/or audio transcription data in the input media data units as received. In some embodiments, the automatic rate control unit (204) may be configured to provide the acoustic analytical results to the time shift unit (202) as a part of or in addition to the automatic rate control information (210).

In some embodiments, the time shift unit (202) is further configured to provide media processing states (214) to the automatic rate control unit (204). The media processing states (214) may include, without limitation, an indicator of a current position (e.g., a timestamp, a unit identifier, a frame number, a sequence number, a data block index, etc.) within the input media signal (206); input media data units preceding the current position have been processed by the time shift unit (202). Additional information relating to one or more media processing operations performed by the time shift unit (202) may also be provided to the automatic rate control unit (204) as a part of the media processing states (214).

An input media data unit as described herein may comprise a whole or a part of audio data and/or audio transcription data for a specific time quantum (e.g., in milliseconds, tens of milliseconds, hundreds of milliseconds, seconds, tens of seconds, etc.) in accordance with a standard or proprietary specification that governs the input media data unit. The input media data unit may also comprise a whole or a part of non-audio related data for the specific time quantum (e.g., in milliseconds, tens of milliseconds, hundreds of milliseconds, seconds, tens of seconds, etc.) in accordance with the standard or proprietary specification that governs the input media data unit. The input media data unit may further comprise media metadata and/or other auxiliary information in accordance with the standard or proprietary specification that governs the input media data unit. The specific time quantum may be associated with a specific sampling rate in accordance with the standard or proprietary specification. The input playing speed may refer to a specific playing speed at which the input media data units are to be used to generate a whole or a part of sound waves as a part of media data rendering for (e.g., successive) time durations respectively equaling to specific time quanta for which the input media data units comprise audio data, audio transcription data, or other types of media data in accordance with the standard or proprietary specification.

Likewise, an output media data unit as described herein may comprise a whole or a part of audio data and/or audio transcription data for a specific time quantum (e.g., in milliseconds) in accordance with a standard or proprietary specification—which may or may not be the same as the standard or proprietary specification that governs the input media data units—that governs the output media data unit. The output media data unit may also comprise a whole or a part of non-audio related data for the specific time quantum (e.g., in milliseconds) in accordance with the standard or proprietary specification that governs the output media data unit. The output media data unit may further comprise media metadata and/or other auxiliary information in accordance with the standard or proprietary specification that governs the output media data unit. The output playing speed may refer to a specific playing speed at which the output media data units are to be used to generate a whole or a part of sound waves as a part of media data rendering for (e.g., successive) time durations respectively equaling to specific time quanta for which the output media data units comprise audio data, audio transcription data, or other types of media data in accordance with the standard or proprietary specification.

In some embodiments, an input media data subset in the multiple input media data subsets may be mapped, resampled, or otherwise converted, by the time shift unit (202) to an output media data subset in the multiple output media data subsets. The input media data subset may comprise one or more input media data units, whereas the (corresponding) output media data subset may comprise zero or more output media data units. Relative to the input playing speed (e.g., 1) for an input media data subset, the output playing speed for a corresponding output media data subset may be any of slower speeds (e.g., 0.8, 0.9, etc.), the same speed (e.g., 1.0), or the faster speeds (e.g., 1.1, 1.5, 2.0, infinite, etc.).

Under techniques as described herein, the output playing speed for an output media data subset may be determined as a function of audio content in a corresponding input media data subset that gives rise or corresponds to the output media data subset. For example, an individual value for the output playing speed for an individual output media data subset may be determined as a function of the number of sentences, words, syllables, etc., in audio data of a corresponding individual input media data subset that gives rise or corresponds to the output media data subset. In some embodiments, audio transcription data may be received with the corresponding individual input media data subset or in one or more separate bitstreams, containers, or datablocks. In these embodiments, the audio transcription data such as closed caption texts may be optionally used at least in part to determine the individual value for the output playing speed. For example, non-repeating texts appearing in closed captions of one or more input video frames may be used to determine an input rate of audio utterance with respect to the one or more input video frames. This input rate of audio utterance as determined may be used along with a preferred rate of audio utterance as specified according to a user's level of audio comprehension to set or determine a value for the output rate of audio utterance in output video frames that correspond to the input video frames.

In some embodiments, at least two of the multiple output media data subsets may be automatically rate controlled to be played at different values for the output playing speed. For example, a first output media data subset of the at least two of the multiple output media data subsets may be automatically played at a first value (e.g., 1.1) for the output playing speed, without user input specifying the first value as the output playing speed. A second different output media data subset of the at least two of the multiple output media data subsets may be automatically played at a second different value (different from the first value, e.g., 1.2 instead of a fixed value 1.1) for the output playing speed, without user input specifying the second value as the output playing speed.

When an output media data subset is played at a value (0.7, 1.1, 2.2, etc.) of the output playing speed different from that (e.g., 1) of the input playing speed for an input media data subset corresponding to the output media data subset, other types of media data may be sub-sampled or super-samples. For example, image frames may be time-wise sub-sampled or super-sampled by dropping frames, adding frames with interpolations, etc. One or more of a wide variety of methods for sub-sampling and/or super-sampling non-audio types of media data may be used by a system as described herein in various embodiments. In some embodiments, audio transcription data such as closed caption texts may or may not be altered in the output image frames. In some embodiments, the system (200) may be directed, for example, by user input to operate in a mode that does not play non-audio data but only plays audio data with variable values for the output playing speed as determined under techniques as described herein; for example, in such a mode, audio may be rendered but video including closed captions if any may not.

Audio data in the multiple input media data subsets may have certain (input) pitches at an input playing speed. For example, audio data of a first input media data subset may comprise a first voice with a first pitch, whereas audio data of a second different input media data subset may comprise a second different voice with a second pitch different from the first pitch. In some embodiments, audio data may not be in input media data but rather is generated by a system as described herein based on audio transcription data using voice synthesis techniques.

The time shift unit (202) may be configured to generate output media data units in the multiple output media data subsets in such a way that the input pitches in audio data of the multiple input media data subsets corresponding to the multiple output media data subsets are maintained in the output media data units. In embodiments in which audio data is generated from audio transcription data, the input pitches may be of a standard voice generated by the voice synthesis techniques. Additionally, optionally, or alternatively, the time shift unit (202) may be configured to generate output media data units in the multiple output media data subsets in such a way that output pitches in audio data of the output media data units may be limited to values in a range around, adjacent to, or a scaling factor of, the input pitches in the audio data of the multiple input media data subsets corresponding to the multiple output media data subsets. As a result, the (audio) pitch quality as rendered may be perceptually the same or similar between the input media signal (206) and the output media signal (208).

In the current example, in a first output media data subset that correspond to the first input media data subset comprising the first voice with the first pitch, even though the first output media data subset may be played at a first value (e.g., 1.5) of the output playing speed different from that (e.g., 1) of the input playing speed, sound waves rendered from audio data of the output media data subset at the first value of the output playing speed may comprise a pitch that is the same as, or substantially similar to (e.g., within a particular relative range of), the first pitch of the first voice in the first input media data subset played at the input playing speed (e.g., 1). Likewise, in a second output media data subset that correspond to the second input media data subset comprising the second voice with the second pitch, even though the second output media data subset may be played at a second different value (e.g., 1.8 instead of 1.5) of the output playing speed different from that of the input playing speed (e.g., 1), sound waves rendered from audio data of the second output media data subset at the second value of the output playing speed may comprise a pitch that is the same as, or substantially similar to (e.g., within a particular relative range of), the second pitch of the second voice in the second input media data subset played at the input playing speed.

In an embodiment, the automatic rate control unit (204) generally represents any device which is configured to provide automatic rate control information (210) to the time shift (202). In some embodiments, the automatic rate control unit (204) is further configured to receive the input media signal (206) comprising the plurality of input media data units, to extract audio data and/or audio transcription data in input media data units, for example with an audio data extractor (212), and to generate acoustic analytical results by analyzing audio data in the plurality of input media data units in the input media signal (206), and to provide acoustic analytical results of the audio data in the input media signal (206) to the time shift unit (202) in addition to or as a part of automatic rate control information (210) to the time shift unit (202). In some embodiments, the automatic rate control unit (204) is further configured to receive the media processing states (214), for example, from the time shift unit (202).

In some embodiments, the acoustic analytical results may be received or retrieved from an external or internal data source, and may or may not be received with the input media data units in the same input signal. In some embodiments, the automatic rate control unit (204) may be configured to analyze (real time or non-real time) the audio content in the audio data and/or audio transcription data transmitted with the input media signal (206) for the purpose of generating the acoustic analytical results.

In some embodiments, the automatic rate control unit (204) may be configured to determine the presence of one or more specific perceptual audio utterance units in an individual portion, or a whole of, the audio content in the audio data transmitted with the input media signal (206) and/or to determine the presence of one or more types of audio transcription data transmitted with the input media signal (206) as a part of analyzing the input media data units.

Additionally, optionally, or alternatively, the automatic rate control unit (204) may be configured to determine an input rate of audio utterance relating to one of the one or more specific perceptual audio utterance units for example at the input playing speed when the input media data units are played at the input playing speed (e.g., 1). For example, the automatic rate control unit (204) may be configured to determine the presence of audio content relating to a natural language, and proceed to determine an input rate of audio utterance for the natural language in the audio content when the input media data units are played at the input playing speed.

Based on the input rate of audio utterance determined in the audio content in the input media signal (206), the automatic rate control unit (204) may be configured to divide the plurality of input media data units in the input media signal (206) into the previously mentioned multiple input media data subsets. For example, input media data units comprising a portion of the audio content with a first input rate of audio utterance may form a first input media data subset, while other input media data units comprising another portion of the audio content with a second input rate of audio utterance may form a second input media data subset.

An input media data subset may comprise one, two, three, or more media data units. An input media data subset may comprise a fixed number of media data units in some implementations and may comprise a variable number of media data units in some other implementations.

In some embodiments, the automatic rate control unit (204) may be configured to take into consideration the above-mentioned preferred rate of audio utterance and/or an average input rate of audio utterance in the audio content of the input media signal (206) in dividing the plurality of input media data units in the input media signal (206) into the previously mentioned multiple input media data subsets.

Acoustic analytical results as described herein may include, without limitation, one or more input media (or audio) data subset descriptors. An input media (or audio) data subset descriptor may include, without limitation, an identifier for an input media (or audio) data subset, position indicators (e.g., timestamps, data unit numbers, frame numbers, data block indexes, sequence numbers, markers, etc.) of starting and ending input media data units in the input media data subset, an indication whether one or more specific audio utterance units are present in the input media data subset, one or more input rates of audio utterance for the specific audio utterance units determined for the input media data subset, variations in the input rates of audio utterance, etc. Additionally, optionally, or alternatively, at least a part of information in an input media data subset descriptor as described herein may be carried by one or more of different types of tags. For example, one or more specific types of tags may be used to carry pitch information (e.g., cadence, etc.) in input media data units or one or more subsets thereof. A tag as described herein may be embedded within media data, media files, media streams, etc., so that a recipient device may extract the tag and perform one or more actions related to the tag. These actions include automatic rate control operations that maintain pitches determined in input media data units.

Techniques related to tags are described in U.S. Pat. No. 7,889,964, the entire content of which are incorporated by reference herein. A device as described herein may be configured with a mechanism for inserting tags into a media stream such as an audio stream, a video stream, a television broadcast stream, etc. Tags may be inserted into a media stream prior to or at the time of transmission. The tags contain command and control information that a recipient device translates and acts upon. During the tag processing stage, the recipient device may be configured to perform operations as described herein in response to the tags. Tags may be used to indicate the start and end points of a program segment, a subset of media data units, etc. Tags may be used to indicate a presence of a media feature, an absence of a media feature, etc. The recipient device may be configured to fast forward, slow forward, skips over a program segment during playback in response to the tags or user input related to the tags.

Menus, icons, and Web pages may be displayed to the user based on information included in a tag. The user may interact with the menu, icon, or Web page through an input device. The recipient device performs the actions associated with the menu, icon, or Web page and the user's input. Tags may be used to create indexes in media data, media streams, media files, etc. This allows the user to jump to particular indexes in the media data, media streams, media files, etc.

A time shift unit as described herein (104 of FIG. 1 or 204 of FIG. 2) may be configured to use the position indicators to locate/identify input media (or audio) data units—in the plurality of input media data units—that belong to the input media data subset. The time shift unit (104 of FIG. 1 or 204 of FIG. 2) may be configured to use an input media data subset descriptor to generate an output media (or audio) data subset that corresponds to the input media data subset.

Under techniques as described herein, input media (or audio) data in a media (or audio) input signal (e.g., 106 of FIG. 1 or 206 of FIG. 2) may be analyzed in real time or non-real time. In some embodiments, the input media data may be analyzed for one or more specific audio utterance units, for example by a server or a system (e.g., 100 of FIG. 1 or 200 of FIG. 2), beforehand. Acoustic analytical results from a non-real time analysis may be saved in a file. When the input media data is later played by a system, the acoustic analytical results may be retrieved/received by the system, instead of the system performing such an analysis on the fly.

Likewise, automatic rate control information (e.g., 110 of FIG. 1 and 210 of FIG. 2) may also be generated in real time or non-real time. For example, instead of generating the automatic rate control information in real time by an automatic rate control unit (104 of FIG. 1 or 204 of FIG. 2), an off-line automatic rate control information generation unit may be used, for example, to generate automatic rate control information. The off-line automatic rate control information may be generated based on the acoustic analytical results, and/or may be saved in a file. At run time, a system as described herein may retrieve/receive the automatic rate control information.

Automatic rate control information (e.g., 110 of FIG. 1 and 210 of FIG. 2) may be given with one or more of different levels of details in different implementations. The automatic rate control information may be provided to an output media data generator such as a time shift unit (102 of FIG. 1 or 202 of FIG. 2) in real time or in non-real time. In an example, the automatic rate control unit (104 of FIG. 1 or 202 of FIG. 2) is configured to keep track of one or more media (or audio) processing states (114 of FIG. 1 or 214 of FIG. 2) of output media data generation. Based on the media processing states (114 of FIG. 1 or 214 of FIG. 2), the automatic rate control unit (104) may be configured to determine an output playing speed value for input media data units that are currently being processed at any given time and to provide the output playing speed value to the time shift unit (102 of FIG. 1 or 202 of FIG. 2). In this example, the automatic rate control information may be given in real time. The automatic rate control information may or may not provide additional information to the time shift unit (102 of FIG. 1 or 202 of FIG. 2) in addition to output playing speed values. In another example, the automatic rate control unit (104) is configured to provide a sequence of rate control instructions in non-real time to the time shift unit (102 of FIG. 1 or 202 of FIG. 2). The sequence of rate control instructions may comprise specific output playing speed values and corresponding index values that may be used to apply the specific output playing speed values to their corresponding portions or subsets of media (or audio) data, respectively.

In some embodiments, acoustic analytical results may not be provided to a time shift unit (e.g., 102 of FIG. 1 or 202 of FIG. 2). The time shift unit (102 of FIG. 1 or 202 of FIG. 2) may be given specific output playing speed values and corresponding indications (in terms of specific points of time, specific data units, etc.) of portions or subsets of media (or audio) data to which the specific output playing speed values are to be applied, respectively.

3.0 Automatic Rate Control

FIG. 3 illustrates example input media signal (306) and output media signal (308), in accordance with an embodiment. The input media signal (306) may be the same as 106 of FIG. 1 or 206 of FIG. 2. Additionally, optionally, or alternatively, the output media signal (308) may be the same as 108 of FIG. 1 or 208 of FIG. 2.

The input media signal (306) may comprise input media (or audio) data units in multiple input media (or audio) data subsets. For the purpose of illustration, the multiple input media data subsets may be generated by an automatic rate control unit (104 of FIG. 1 or 204 of FIG. 2) based on individual input rates of audio utterance relating to one or more specific audio utterance units such as human voice in one or more natural languages (which may include but is not limited to any of utterances that may or may not have linguistic meanings). A first input media data subset (302-1) may comprise first input media data units at a first input rate of audio utterance; a second input media data subset (302-2) may comprise second input media data units at a second input rate of audio utterance; a third input media data subset (302-3) may comprise third input media data units at a third input rate of audio utterance; and a fourth input media data subset (302-4) may comprise fourth input media data units at a fourth input rate of audio utterance. For the purpose of illustration only, the first, second and third media data subsets all comprise audio content of specific audio utterance units (e.g., human voices/utterances) associated with a system-configured or user-configured preferred rate of audio utterance, whereas the fourth media data subset does not comprise such audio utterance units (human voices/utterances in the present example).

In an example embodiment, the first input rate of audio utterance may be faster than the second and third input rates of audio utterance; the second input rate of audio utterance may be faster than the third input rate of audio utterance; the third input rate of audio utterance may be a non-zero finite value; and the fourth input rate of audio utterance may be indicated as undefined or zero as the specific audio utterance units against which the input rates of audio utterance are measured may be absent in the fourth input media data subset.

A system (e.g., 100 of FIG. 1 or 200 of FIG. 2), or a time shift unit (102 of FIG. 1 or 202 of FIG. 2) therein, may be configured to generate the output media signal (308) based at least in part on the input media signal (306) and one or more input media (or audio) data subset descriptors (e.g., 110 of FIG. 1 or 210 of FIG. 2). Additionally, optionally, or alternatively, tags may be embedded in media streams to carry at least a part of information in the one or more input media (or audio) data subset descriptors (110 of FIG. 1 or 210 of FIG. 2). The output media signal (308) may comprise output media (or audio) data units in multiple output media (or audio) data subsets corresponding to the multiple input media data units in the input media signal (306). In some embodiments, first, second and third output media data subsets (304-1 through 304-3) of FIG. 3, and their corresponding first, second and third input media data subsets (302-1 through 302-3) of FIG. 3 all comprise the specific audio utterance units with which the preferred rate of audio utterance is associated. The first output media data subset (304-1) of FIG. 3 may comprise first output media data units with audio data to be rendered at a first value for the output playing speed; the second output media data subset (304-2) of FIG. 3 may comprise second output media data units with audio data to be rendered at a second value for the output playing speed; and a third output media data subset (304-3) of FIG. 3 may comprise third output media data units with audio data to be rendered at a third value for the output playing speed. In some embodiments, at least two of these output playing speeds may be of different finite values, even though the underlying rates of audio utterance when played at their respective values of the output playing speed may be the same, for example, as the preferred rate of audio utterance. In an example embodiment, the first value for the output playing speed may be 1.1× the input playing speed (e.g., 1); however, the rate of audio utterance for the first output media data subset rendered at the first value for the output playing speed is the same as the preferred rate of audio utterance. Similarly, the second value for the output playing speed may be 1.5× the input playing speed (e.g., 1); however the rate of audio utterance for the second output media data subset rendered at the second value for the output playing speed is also the same as the preferred rate of audio utterance. The third value for the output playing speed may be 1.8× the input playing speed (e.g., 1); however the rate of audio utterance for the third output media data subset rendered at the third value for the output playing speed is still the same as the preferred rate of audio utterance.

The input media data units (e.g., 302-1 through 302-3) may comprise audio data at respective pitches when played at the input playing speed (e.g., 1). In some embodiments, in light of the corresponding output media data subsets (e.g., 304-1 through 304-3) to be rendered at variable values (e.g., 1.1, 1.5, and 1.8) for the output playing speed, the time shift unit (102 of FIG. 1 or 202 of FIG. 2) may be configured to generate output media data units in the output media data subsets (304-1 through 304-3) in such a way that the pitches in audio data of input media data units, if the relevant audio utterance units associated with the preferred rate of audio utterance exist, is maintained in audio data of output media data units corresponding to the input media data units.

In some embodiments, an input media data subset (e.g., 302-4) may not have the acoustic or audio content characteristics associated with the preferred rate of audio utterance. For example, in embodiments in which the preferred rate of audio utterance is given as syllables uttered per unit time, the input media data subset (302-4) may not have audio data comprising human-like voice or audio transcription data comprising data for voice synthesis. The system (100 of FIG. 1 or 200 of FIG. 2), or the time shift unit (102 of FIG. 1 or 202 of FIG. 2) therein, may be configured to generate a corresponding output media data subset (which may or may not be an empty set) representing a default value (which may be the fastest value) for the output playing speed. Examples of default values for the output playing speed when specifically looked-for audio utterance units are missing in an input media data subset (302-4 in the present example) may be any real values (e.g., positive real values).

In a particular embodiment such a default value may be infinite; the corresponding output media data subset (e.g., 304-4) may be an empty set comprising zero output media data units to be played, as illustrated in FIG. 3. In this particular embodiment, media data in the input media data subset (e.g., 302-4) may be skipped in the output media signal (308). For example, a voice mail application that implements techniques as described herein may determine that there is a 30 second silence in a voice message and thus may skip the entire 30 second silence when a user selects to review the voice message at a preferred rate of audio utterance as described herein.

The approach of performing rate control in rendering media (or audio) data under techniques as described herein is very different from other approaches. In other approaches, a user selects, for the output playing speed, a specific fixed value (e.g., 1.5× the input playing speed) from a specific range (1.0× to 2.0; which is limited by a specific upper bound value) supported by media (or audio) processing systems.

In sharp contrast, in the approach under techniques as described herein, a user selects a preferred rate of audio utterance, which results in variable values for the output playing speed, relative to the input playing speed. The variable values, as well as their range, for the output playing speed depend on underlying audio utterance units associated with the preferred rate of audio utterance embedded within audio data (including but not limited to audio data generated by voice synthesis) of input media data units. The output playing speed under techniques as described herein may be variably set to different values based on both the preferred rate of audio utterance and acoustic analytical results (e.g., input audio data subset descriptors, tags embedded in media streams, etc.) determined from the audio data in the input media data units. In some embodiments, the variable values for the output playing speed under techniques as described herein may not be bound by a finite value. For example, in some embodiments, while audio data containing the specific audio utterance units associated with the preferred rate of audio utterance is to be rendered at different finite values for the output playing speed, audio data not containing the specific audio utterance units may be skipped or rendered with an infinite value for the output playing speed. This is very different from other approaches under which only a range bounded by a finite value is available for a user to select for the output playing speed.

As used herein, media data may refer to any data containing audio content including but not limited to any of audio data, audio transcription data, audiovisual data, multimedia data, internet downloaded content data, multimedia data with markup language pages, videos, movies, multimedia presentations, audio books, electronic books, podcasts, etc. A media data unit may refer to any data unit containing audio data including but not limited to any of audio samples, audio transcription data that may be used for voice synthesis, audio data units, audiovisual data units, media data segments, image frames, etc. Media data may be received by a system as described herein using one or more of wire-based links or wireless links. Media data may be received in the form of a media file, a media data stream, etc. Media data may be received with any of a wide variety of formats defined by standard or proprietary specifications including but not limited to any related to CD, MPEG-1, MPEG-2, and MPEG-2.5 Audio Layer III (MP3), Advanced Audio Coding (AAC), DVD, HD DVD, Blu-ray Disc, H.261, H.263, H.264/MPEG-4, etc.

4.0 Example Multimedia Device

Figure 4A:
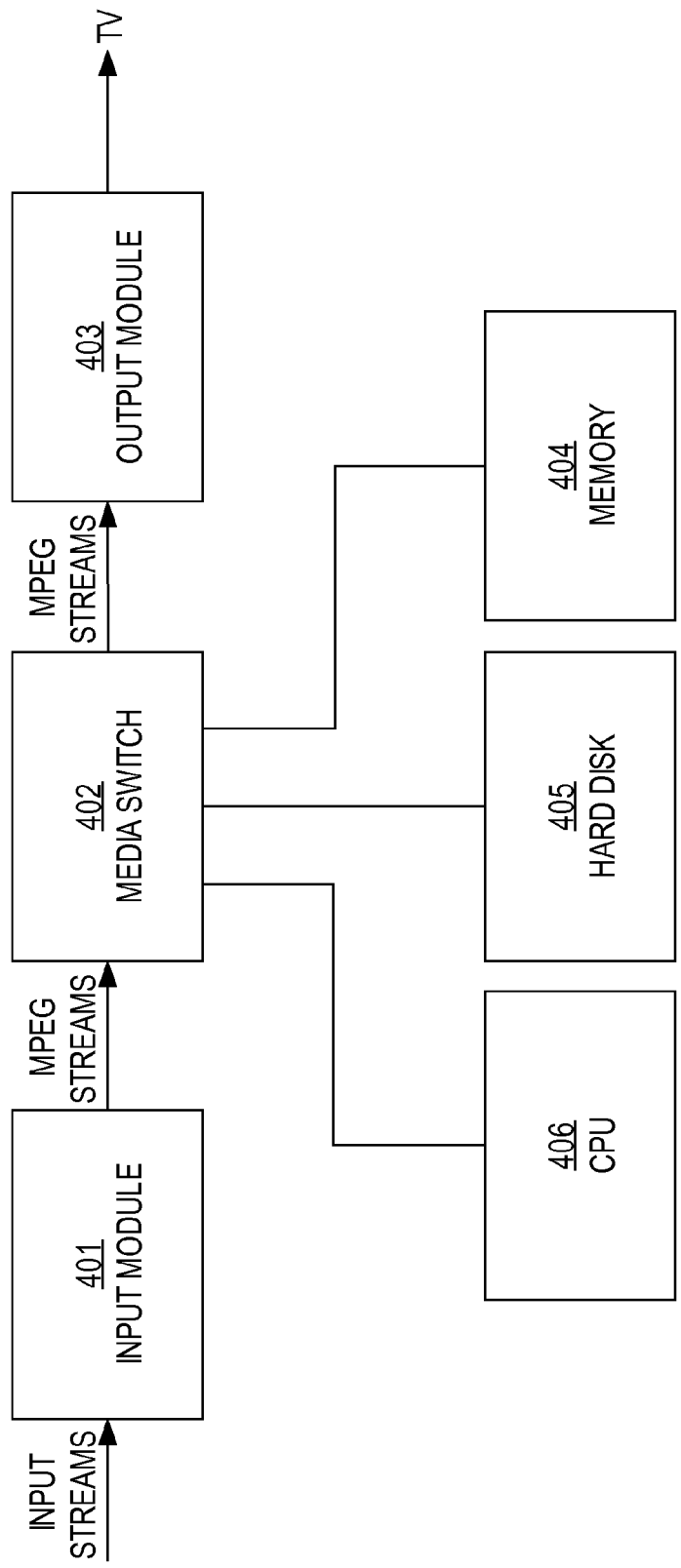
FIG. 4A illustrates an example digital video recorder that may implement automatic rate control in accordance with one or more embodiments.

FIG. 4A is a block diagram that shows an example of the internal structure and operation of a multimedia device, according to an embodiment of the invention. An example of the internal structure and operation of a media device such as a digital video recorder (DVR) is further described in U.S. Pat. No. 6,233,389, which is incorporated by reference as though originally disclosed herein. In some embodiments, the multimedia device may further comprise some or all of the software and/or components as illustrated in FIG. 1 or FIG. 2.

The multimedia device shown in FIG. 4A comprises an input module 401, a media switch 402, and an output module 403. Input module 401 receives television (TV) input streams in any of a variety of forms. For example, a TV input stream received by input module 401 may take the form of a National Television Standards Committee (NTSC) compliant signal or a PAL compliant broadcast signal. For another example, a TV input stream received by input module 401 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment, input module 401 produces MPEG streams. In another embodiment, input module 401 produces streams that are encoded using a different codec.

An MPEG-2 transport multiplex supports multiple programs in the same broadcast channel, which multiple video and audio feeds and private data. Input module 401 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 401 and passed to the other modules as if the signals had been delivered via an MPEG-2 private data channel.

Media switch 402 mediates between a microprocessor CPU 406, a hard disk or storage device 405, and memory 404. Input streams are converted to an MPEG stream and sent to media switch 402. Media switch 402 buffers the MPEG stream into memory 404. Media switch 402 then performs two operations if a user of the multimedia device is watching real-time TV: media switch 402 sends the MPEG stream to output module 403 and simultaneously writes the MPEG stream to hard disk or storage device 405.

Output module 403 receives MPEG streams as input and produces an analog TV signal according to NTSC, PAL, or other TV standards. Output module 403 comprises an MPEG decoder, an on-screen display (OSD) generator, an analog TV encoder, and audio logic. The OSD generator allows the program logic to supply images which may be overlaid on top of the resulting TV analog signal. Additionally, output module 403 can modulate information supplied by the program logic onto the VBI of the output signal in a number of standard formats, including NABTS, CC, and EDS.

5.0 Example Embodiments

Figure 4B:
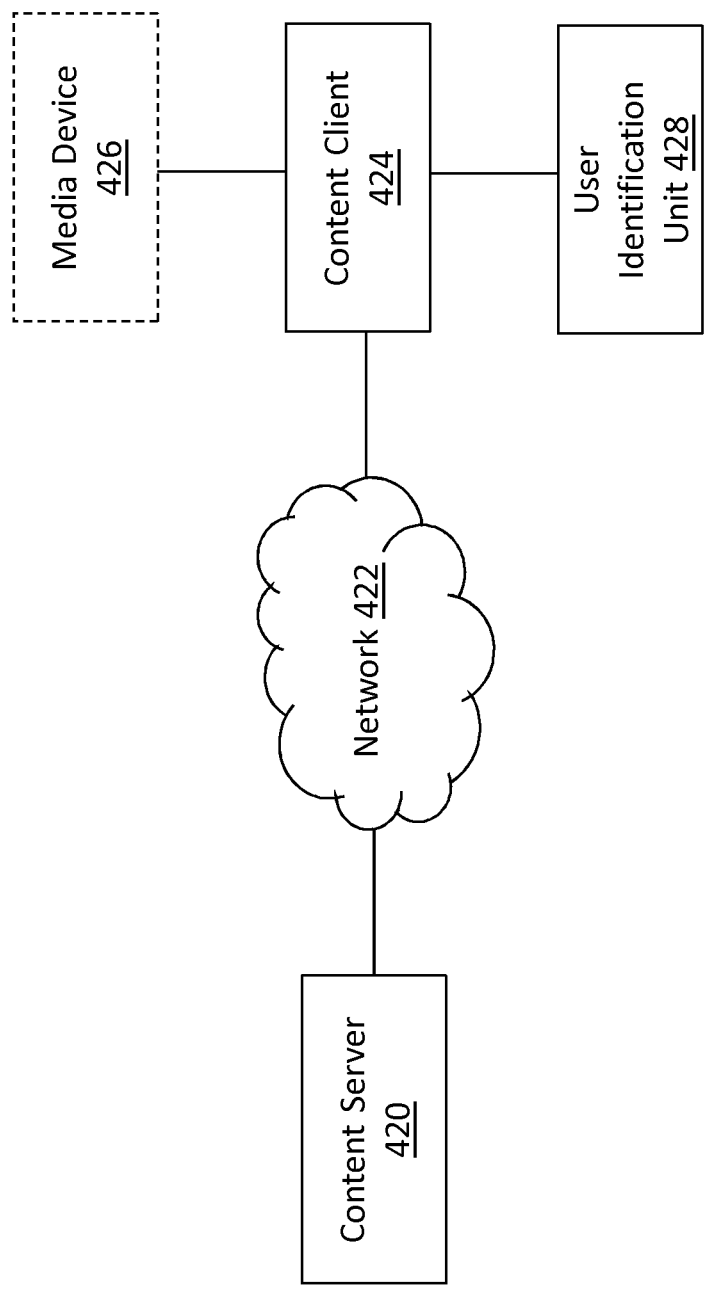
FIG. 4B and FIG. 4C illustrate example system configurations in accordance with one or more embodiments.

FIG. 4B illustrates an example configuration for performing automatic rate control of media data playing, in accordance with an embodiment. A content server 420 such as an internet-based server, an intranet based server, a home based server, a content database system, content distribution system, a server farm, a cloud computing server node, etc., may be configured to provide media data to one or more content clients (e.g., 424 of FIG. 4B) over a network 422. Examples of content clients include but are not limited to: set top boxes, DVRs, tablet computers, PCs, handheld devices, etc. Examples of networks include but are not limited to: local area networks, wide area networks, wire-line networks, wireless networks, service provider networks, dedicated links, etc.

In a first operational mode, one or more of content server 420, content client 424, a media device (426), a user identification unit (428), etc., may be configured to present to a user selections of supported audio utterance units to which preferred rates of audio utterance may be associated, and receive one or more users' input that specifies respective preferred rates of audio utterance that are associated with one or more specific audio utterance units.

In some embodiments, the content client 424 may include, or operate in conjunction with, one or more of one or more media devices (one of which may be 426), one or more user identification units (one of which may be 428), tablet computers, display systems, handheld devices, etc., configured to interact with the users. Content client 424, media device 426, user identification unit 428, etc., may be operatively linked with one or more of a wide variety of wireless or wire-based connections and/or networks. For example, the media device (426) may be connected with the content client 424 through a (e.g., local) router or through a dedicated link (e.g., HDMI, etc.).

In the first operational mode, content client 424 may interact with a user to receive user input that specifies a preferred rate of audio utterance. Upon receiving the preferred rate of audio utterance, content client 424 may request user identification unit 428 to collect, analyze, and/or store the user's biometric data with the preferred rate of audio utterance. Additionally, optionally, or alternatively, the preferred rate of audio utterance as specified by the user may be used to perform one or more automatic rate control operations in rendering media data to the user.

In a second operational mode, content client 424 may be configured to interact with other devices (e.g., user identification unit 428) to automatically (e.g., without user input) determine a preferred rate of audio utterance based on user identities for users who are present at a particular location (e.g., where media data is being, or is to be, rendered). The preferred rate of audio utterance as automatically determined by user identification unit 428 may be used to perform one or more automatic rate control operations in rendering media data to the user. In the second operational mode, operations relating to determining user identities, determining a specific preferred rate of audio utterance, and rendering media data based on the specific preferred rate of audio utterance may be repeated from time to time, for example, periodically, every few minutes, every time when a user is leaving or entering the location at which the media data is being rendered, etc.

In some embodiments, the content server 420 may implement the functionality of system 100 of FIG. 1 or system 200 of FIG. 2. Thus, the content server 420 may be configured to analyze audio content from server-accessible media data, to divide the server-accessible media data into a plurality of media data subsets, to apply different values of an output playing speed to different subsets in the plurality of media data subsets, and to generate output media data subsets that form output media data based at least in part on the different values of the output playing speed. The output media data may be provided by the content server 420 to the content client 424. In some embodiments, time information in the server-accessible media data is also provided to the content client 424. For example, a particular playing time (e.g., 2 minutes) of the output media data may correspond to a different playing time (e.g., 10 minutes) in the server-accessible media data. In some embodiments, a recipient of output media data that has been processed by (e.g., pitch-correct) automatic rate control playing techniques may be given corresponding time information that links between playing times of the output media data and playing times of corresponding server-accessible or input media data.

In an embodiment, user identification unit 428 generally represents any device comprising one or more processors and configured to determine one or more user identities of one or more respective users at a particular location which media data is being, or is to be, played, and to provide the one or more user identities to one or more other units/modules such as the content client 424, the media device 426, etc. A user identification unit 428 may refer to a single device, a combination of devices, a standalone box, a part of a set-top box cable receiver, a part of a DVR, a part of television set, a home security system, a home entertaining system, a theater, a conference system, etc. One or more individual components that may be included in the user identification unit 428 are described below with reference to FIG. 4C.

In some embodiments, the content client 424 may implement the functionality of system 100 of FIG. 1 or system 200 of FIG. 2. Thus, the content client 424 may be configured to analyze audio content from input media data received from the content server 420, divide the input media data into a plurality of input media data subsets, apply different values of an output playing speed to different subsets in the plurality of input media data subsets, generate output media data subsets that form output media data based at least in part on the different values of the output playing speed, etc.

In some embodiments, the content server 420 and the content client 424 may jointly implement the functionality of system 100 of FIG. 1 or system 200 of FIG. 2. For example, the content server 420 may be configured to analyze audio content of server-accessible media data that is to be delivered to the content client 424. This may be performed (e.g., on one or more types of most frequently selected audio utterance units) before the server-accessible media data is made available to the content client 424, or may be performed (e.g., the content server 420 may be preconfigured with, or may be configured to receive, types of specific audio utterance units for which the server-accessible media data is to be analyzed) as a part of delivering the server-accessible media data to the content client 424. Results of the server-based analyses of the input or server-accessible media data may be provided as media metadata to the content client or may be retrieved by the content client 424 as separate (e.g., index) files, data structures, etc. Additionally, optionally, or alternatively, results of the server-based analyses of the input or server-accessible media data may be provided as tags to the content client, retrieved by the content client 424 as tags embedded in media streams, etc. The results of the server-based analyses inform the content client 424 of rates of audio utterance (e.g., sentences, words, syllables, etc., per unit time) at different input media times of the input media data. As used herein, a media time in media data may refer to an aggregated time of all time quanta represented by all preceding media data units, in a sequence of media data units that constitute the media data, up to a particular media data unit of the media data. The content client 424 may be further configured to divide the input media data into a plurality of input media data subsets based on the results of the server-based analyses of the input media data, apply different values of an output playing speed to different subsets in the plurality of input media data subsets, generate output media data subsets that form output media data based at least in part on the different values of the output playing speed, etc.

The content client 424 may be configured to render the output media data produced with the (e.g., pitch-correct) automatic rate control playing techniques. Alternatively, another device such as media content 426 (which may be a display system, a tablet computer, a mobile device, etc.) may be configured to render the output media data.

Figure 4C:
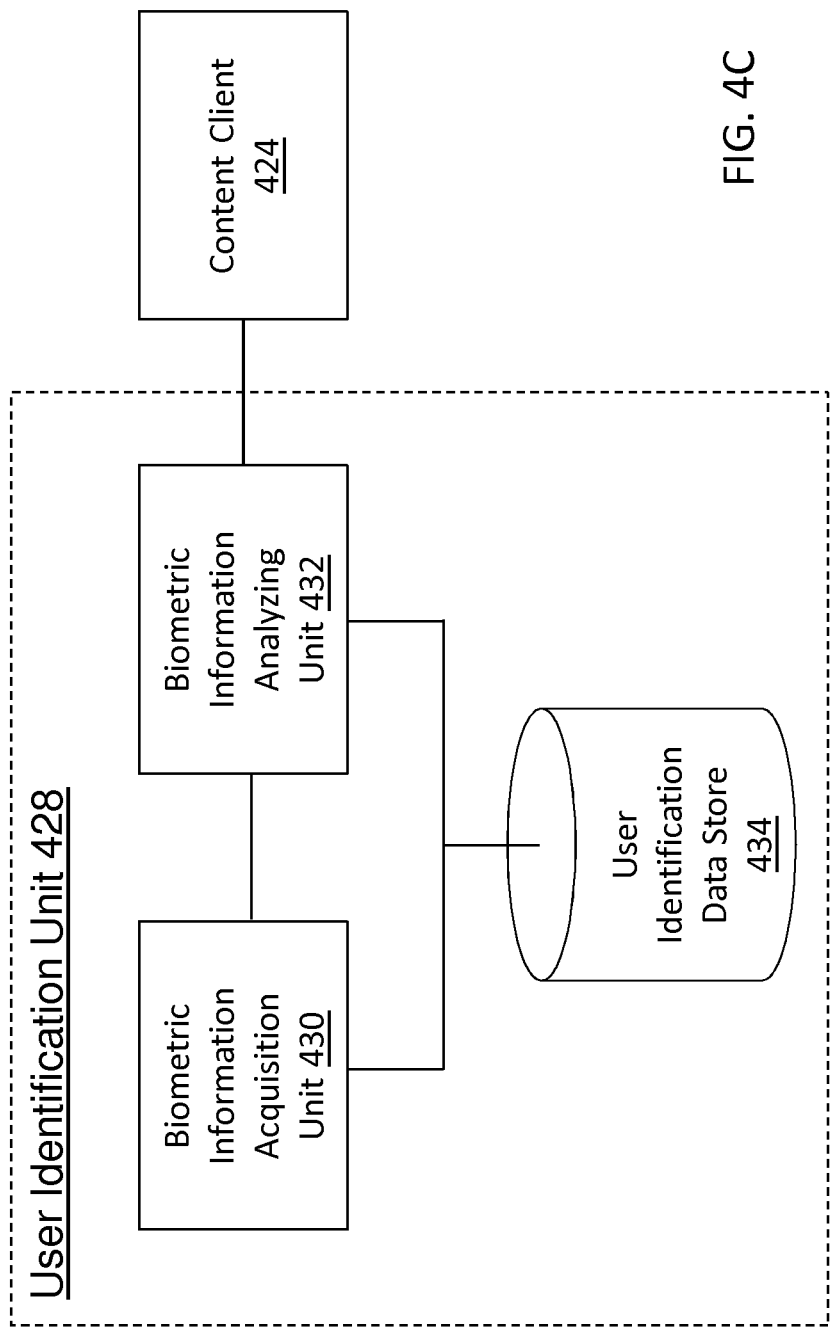

FIG. 4C illustrates an example configuration according to an embodiment of the invention which includes a content client (424) and a user identification unit (428). It should be noted that the example configuration is for illustration purposes only. Other configurations, including but not limited to those in which a user identification unit directly interacts with a content server, may be used to implement automatic rate control techniques as described herein. Each of these devices and services are presented to clarify the functionalities described herein and may not be necessary to implement one or more embodiments. Furthermore, devices and services not shown in FIG. 4C may also be used to perform the functionalities described herein.

In an embodiment, user identification unit 428 comprises a biometric information acquisition unit (430), a biometric information analyzing unit (432), and a user identification data store (434) generally representing local and/or remote memory storage used to store, retrieve, update, or remove data associated with the techniques described herein. In some embodiments, user identification unit 428 may be integrated with a client server (e.g., 420), a content client (e.g., 424), a media client (e.g., 426), or another device.

In an embodiment, user identification data store 434 generally represents one or more storage devices/modules that can be used to store, retrieve, update, or remove preferred rates of audio utterance with respective users' identification information. A preferred rate of audio utterance and its respective user's identification information may be associated (e.g., through a look-up relationship, a hash table, etc.) in user identification data store 434. In some embodiments, user identification data store 434 may be locally attached, locally accessible, or remotely accessible to user identification unit 428.

In an embodiment, biometric information acquisition unit 430 generally represents one or more devices/modules that can be used to collect biometric data from one or more users at a location and/or to provide the collected biometric data to other modules/devices (e.g., biometric information analyzing unit 432) for further analysis. In an embodiment, one or more types of sensor elements such as microphones, cameras, eye iris sensors, fingerprint sensors, infrared sensors, etc., may be used by biometric information acquisition unit 430 to acquire one or more types of biometric data from users at a location. In some embodiments, sensor may be part of another device (e.g., a remote control, a phone, a tablet, a keyboard, etc.) that is communicatively coupled with user identification unit 428. The sensors may be communicatively coupled with biometric information acquisition unit 430 via USB, External Serial Advanced Technology Attachment (eSATA), Parallel ATA, Serial ATA, Bluetooth, infrared, IR, wireless, etc. In an embodiment, one or more of the sensors may be configured to enable the detection of one or more users' presence at the location and to acquire biometric data from the users for the purpose of determining corresponding user identities.

In an embodiment, biometric information analyzing unit 432 generally represents one or more devices/modules that can be used to (e.g., in real time, in substantially the same time, on a delay basis with a certain time delay, etc.) analyze biometric data collected from one or more users at a location, determine/detect the users' presences or user identities based at least in part on biometric data collected from the users, and store results of analyzing biometric data as biometric feature data in user identification data store 434.

In a first operational mode, biometric data acquisition unit 430 may be configured to capture biometric data upon receiving a request from another device (e.g., content client 424). The request for capturing biometric data may be made by content client 424 when a user specifies a preferred rate of audio utterance after content client 424 has been configured to operate in the first operational mode. Biometric information analyzing unit 432 may be configured to receive the collected biometric data, process/analyze the collected biometric data into biometric feature information—e.g., facial characteristics, voice characteristics, fingerprint characteristics, etc.—that may be later used to identify the user. Biometric data can be biological-based, physiological-based, behavioral-based, etc. Examples of biometric data include, but are not limited to only, fingerprint, face recognition, palm print, hand geometry, iris recognition, retina, a person's voice, etc. As described herein, an analysis of biometric data may include but is not limited to: one or more of voice frequency analyses, fingerprint analyses, relative luminance analyses of facial features, relative position analyses of facial features, etc. The collected biometric data and/or biometric feature information and/or the preferred rate of audio utterance may be stored in user identification data store 434.

In a second operational mode, biometric data acquisition unit 430 may be configured to capture biometric data upon receiving a request from another device (e.g., content client 424). The request for capturing biometric data may be made by content client 424 after content client 424 has been configured to operate in the second operational mode. Biometric information analyzing unit 432 may be configured to receive the collected biometric data, and process/analyze the collected biometric data to identify user identities at a particular location. The collected biometric data may be compared with biometric feature information for a plurality of users stored in user identification data store 434 to determine the one or more users' presences or one or more user identities corresponding to the users at the location. Comparison may be based on facial features, voice characteristics, fingerprint characteristics, etc., of the users as determined from the biometric data by biometric information analyzing unit 432.

Additionally, optionally, or alternatively, biometric information analyzing unit 432 may be further configured to determine a specific preferred rate of audio utterance based at least in part on the user identities as identified through the collected biometric data. In some embodiments, biometric information analyzing unit 432 may be configured to determine an individual preferred rate of audio utterance for each of the users identified through the collected biometric data. Different preferred rates of audio utterance may be obtained for different users at the same location. In some embodiments, biometric information analyzing unit 432 may be configured to select a specific preferred rate of audio utterance to represent a collective preferred rate of audio utterance for the users present. For example, biometric information analyzing unit 432 may be configured to select a lowest, a medium, an average, etc., of the preferred rates of audio utterance as the specific preferred rate of audio utterance. Biometric information analyzing unit 432 may be configured to provide the specific preferred rate of audio utterance to other devices/modules such as content client 424.

In various embodiments, one, two or more devices such as one or more of those illustrated may be singly or jointly implement at least some of the techniques as described herein.

Figure 5A:
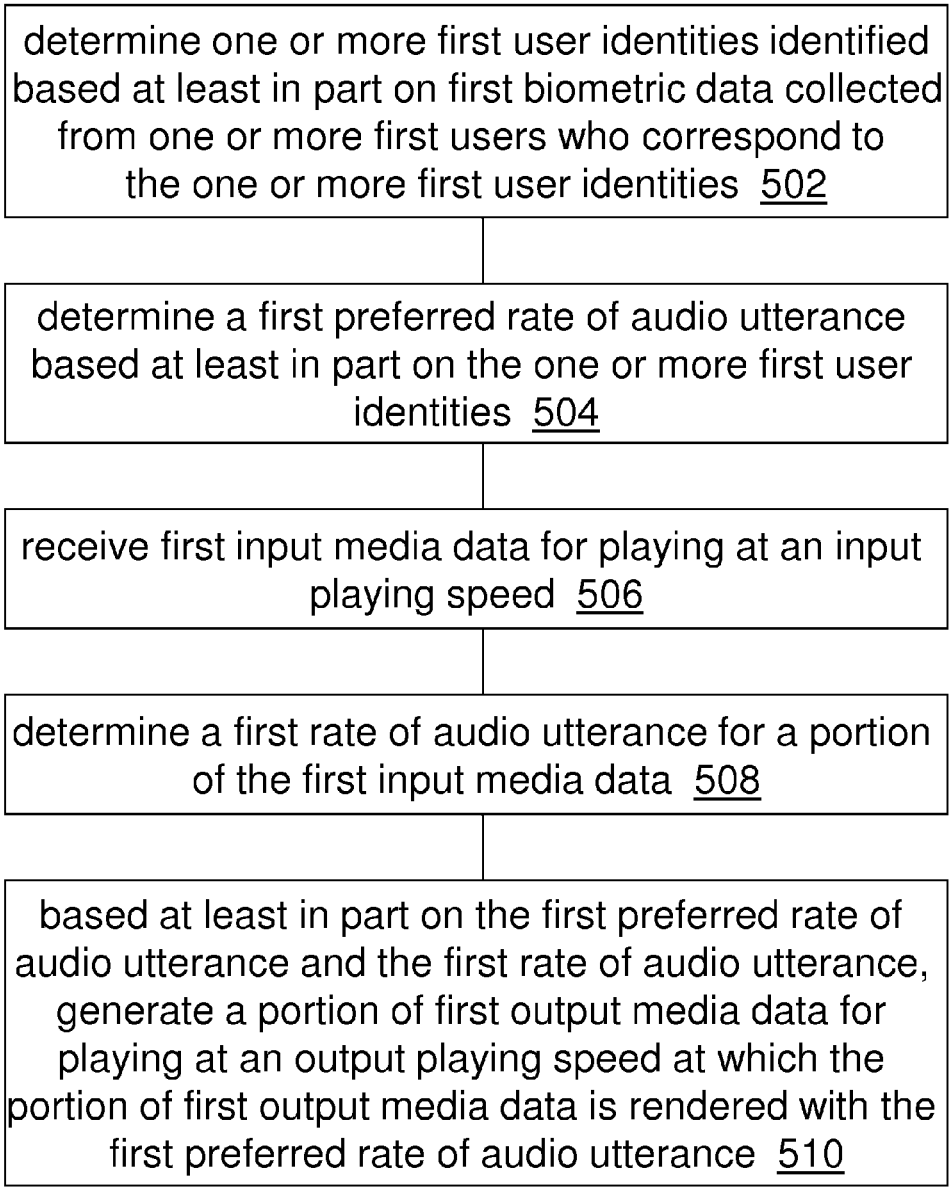
FIG. 5A and FIG. 5B illustrate example process flows in accordance with one or more embodiments.

FIG. 5A illustrates an example process flow for (e.g., pitch-correct) automatic rate control playing, according to an example embodiment. In some embodiments, a system (e.g., 100 of FIG. 1, 200 of FIG. 2, DVR of FIG. 4A, one or more system components of FIG. 4B and/or FIG. 4C) comprising one or more computing devices (e.g., 600 of FIG. 6) may perform this process flow.

In block 502, the system determines one or more first user identities identified based at least in part on first biometric data collected from one or more first users who correspond to the one or more first user identities.

In block 504, the system determines a first preferred rate of audio utterance based at least in part on the one or more first user identities.

In block 506, the system receives first input media data for playing at an input playing speed.

In block 508, the system determines a first rate of audio utterance for a portion of the first input media data.

In block 510, the system, based at least in part on the first preferred rate of audio utterance and the first rate of audio utterance, generates a portion of first output media data for playing at an output playing speed at which the portion of first output media data is rendered with the first preferred rate of audio utterance.

In an embodiment, the one or more first user identities are identified by an entity, external to a media device that generates the portion of output media data, based on the first biometric data collected from the one or more first users who correspond to the one or more first user identities. In another embodiment, the one or more first user identities are identified by a media device, which generates the portion of output media data, based on the first biometric data collected from the one or more first users who correspond to the one or more first user identities.

In an embodiment, the system may be further configured to perform: dividing the first input media data into a plurality of first input media data subsets, wherein the portion of the first input media data belongs to a first input media data subset in the plurality of first input media data subsets; determining a different rate of audio utterance for a different input media data subset in the plurality of first media data subsets; based at least in part on the first preferred rate of audio utterance and the different rate of audio utterance, generating a different portion of first output media data for playing at the output playing speed at which the different portion of first output media data is rendered with the first preferred rate of audio utterance.

In an embodiment, audible pitches respectively produced by the portion of first output media data rendered at the output playing speed and produced by the portion of first input media data rendered at the input playing speed are perceptually same.

In an embodiment, the system may be further configured to store the first rate of audio utterance in a data store.

In an embodiment, the system may be further configured to embed one or more tags in a media stream, wherein the one or more tags are generated based at least in part on the first rate of audio utterance.

In an embodiment, the first rate of audio utterance and the first preferred rate of audio utterance are associated with one or more audio utterance units of the input media data. In an embodiment, at least one of the first rate of audio utterance or the first preferred rate of audio utterance relates to one of a rate of audio utterance for sentences, a rate of audio utterance for words, or a rate of audio utterance for syllables. In an embodiment, at least one of the first rate of audio utterance or the first preferred rate of audio utterance is derived from audio transcription data. In an embodiment, at least one of the first rate of audio utterance or the first preferred rate of audio utterance is derived from one or more tags embedded in a media stream.

Figure 5B:
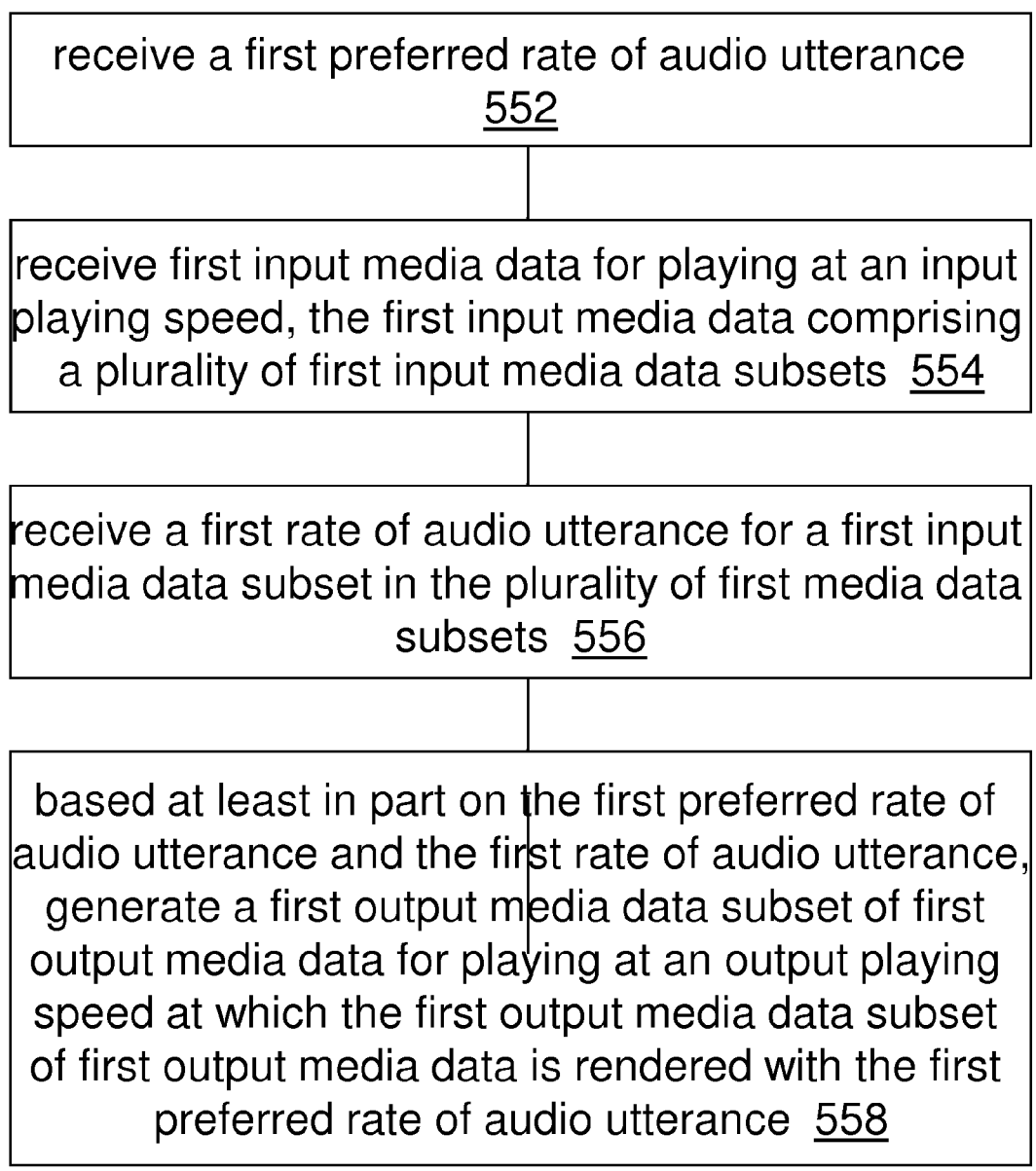

FIG. 5B illustrates an example process flow for (e.g., pitch-correct) automatic rate control playing, according to an example embodiment. In some embodiments, a system (e.g., 100 of FIG. 1, 200 of FIG. 2, DVR of FIG. 4A, one or more system components of FIG. 4B and/or FIG. 4C) comprising one or more computing devices (e.g., 600 of FIG. 6) may perform this process flow.

In block 552, the system receives a first preferred rate of audio utterance. The first preferred rate of audio utterance is determined based at least in part on one or more first user identities; the one or more first user identities are identified based on first biometric data collected from one or more first users who correspond to the one or more first user identities.

In block 554, the system receives first input media data for playing at an input playing speed, the first input media data comprising a plurality of first input media data subsets.

In block 556, the system receives a first rate of audio utterance for a first input media data subset in the plurality of first media data subsets.

In block 558, the system, based at least in part on the first preferred rate of audio utterance and the first rate of audio utterance, generates a first output media data subset of first output media data for playing at an output playing speed at which the first output media data subset of first output media data is rendered with the first preferred rate of audio utterance.

Embodiments include an apparatus comprising a processor and configured to perform any one of the foregoing methods. Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

6.0 Hardware Overview

Figure 6:
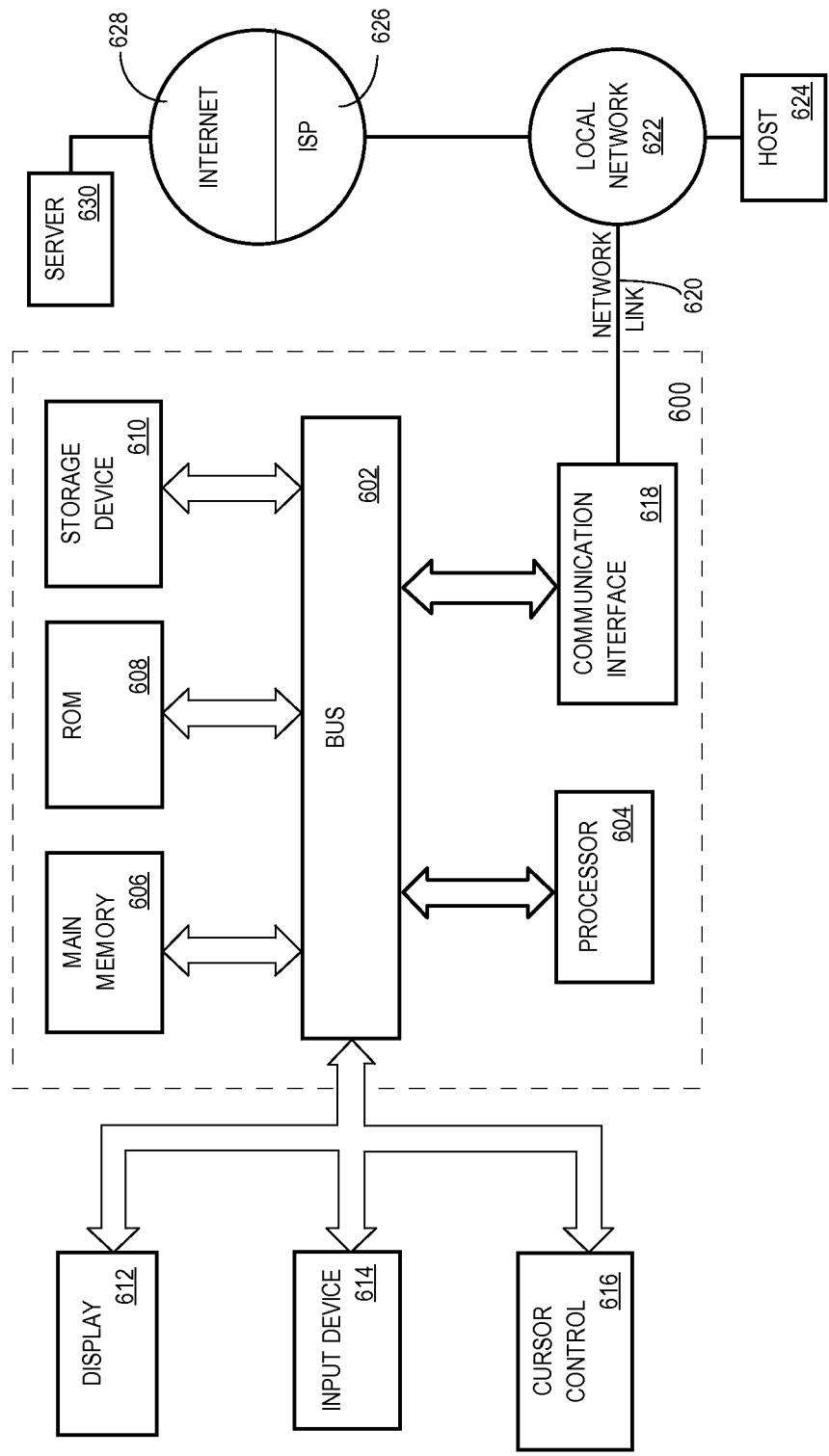
FIG. 6 shows a block diagram that illustrates a system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for a window configuration unit. According to one embodiment of the invention, the window configuration unit is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a remote display device as described herein.

The received code may be executed by processor 604 as it is received, and/or stored in storage device 610, or other non-volatile storage for later execution. In this manner, computer system 600 may obtain application code in the form of a carrier wave.

7.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

The invention claimed is:

1. A method comprising:
   receiving input media data with an input normal playback speed, the input media data comprising a plurality of input media data portions each having the same input normal playback speed;
   determining one or more user identities identified based at least in part on biometric data collected from one or more users who correspond to the one or more user identities and to whom audio utterance derived from the input media data is to be played;
   determining a preferred rate of audio utterance based at least in part on the one or more user identities;
   determining a plurality of rates of audio utterance for the plurality of input media data portions;
   based at least in part on the preferred rate of audio utterance and the plurality of rates of audio utterance, generating audio output media data comprising a plurality of output media data portions having at least two different output normal playback speeds but the same preferred rate of audio utterance;
   wherein the method is performed by one or more computing devices.

2. The method as recited in claim 1, wherein the one or more user identities are identified by an entity, external to a media device that generates the portion of audio output media data, based on the biometric data collected from the one or more users who correspond to the one or more user identities.

3. The method as recited in claim 1, wherein the one or more user identities are identified by a media device, which generates the portion of audio output media data, based on the biometric data collected from the one or more users who correspond to the one or more user identities.

4. The method as recited in claim 1, further comprising:
   dividing the input media data into the plurality of input media data portions.

5. The method as recited in claim 1, wherein audible pitches respectively produced by the plurality of audio output media data portions rendered at the at least two or more different output normal playback speeds and produced by the plurality of input media data portions rendered at the input normal playback speed are perceptually same.

6. The method as recited in claim 1, wherein at least one of the plurality of rates of audio utterance or the preferred rate of audio utterance relates to one of a rate of audio utterance for sentences, a rate of audio utterance for words, or a rate of audio utterance for syllables.

7. The method of claim 1, wherein the plurality of rates of audio utterances for the plurality of input media data portions is received from a server.

8. A non-transitory computer readable storage medium comprising instructions, which when executed by one or more processors cause performance of steps of:
   receiving input media data with an input normal playback speed, the input media data comprising a plurality of input media data portions each having the same input normal playback speed;
   determining one or more user identities identified based at least in part on biometric data collected from one or more users who correspond to the one or more user identities and to whom audio utterance derived from the input media data is to be played;
   determining a preferred rate of audio utterance based at least in part on the one or more user identities;
   determining a plurality of rates of audio utterance for the plurality of input media data portions;
   based at least in part on the preferred rate of audio utterance and the plurality of rates of audio utterance, generating audio output media data comprising a plurality of output media data portions having at least two different output normal playback speeds but the same preferred rate of audio utterance.

9. The medium as recited in claim 8, wherein the one or more user identities are identified by an entity, external to a media device that generates the portion of audio output media data, based on the biometric data collected from the one or more users who correspond to the one or more user identities.

10. The medium as recited in claim 8, wherein the one or more user identities are identified by a media device, which generates the portion of audio output media data, based on the biometric data collected from the one or more users who correspond to the one or more user identities.

11. The medium as recited in claim 8, wherein the steps further comprise:
    dividing the input media data into the plurality of input media data portions.

12. The medium as recited in claim 8, wherein audible pitches respectively produced by the plurality of audio output media data portions rendered at the at least two or more different output normal playback speeds and produced by the plurality of input media data portions rendered at the input normal playback speed are perceptually same.

13. The medium as recited in claim 8, wherein at least one of the plurality of rates of audio utterance or the preferred rate of audio utterance relates to one of a rate of audio utterance for sentences, a rate of audio utterance for words, or a rate of audio utterance for syllables.

14. The medium of claim 8, wherein the plurality of rates of audio utterances for the plurality of input media data portions is received from a server.

15. An apparatus comprising:
   a subsystem, implemented at least partially in hardware, that receives input media data with an input normal playback speed, the input media data comprising a plurality of input media data portions each having the same input normal playback speed;
   a subsystem, implemented at least partially in hardware, that determines one or more user identities identified based at least in part on biometric data collected from one or more users who correspond to the one or more user identities and to whom audio utterance derived from the input media data is to be played;
   a subsystem, implemented at least partially in hardware, that determines a preferred rate of audio utterance based at least in part on the one or more user identities;
   a subsystem, implemented at least partially in hardware, that determines a plurality of rates of audio utterance for the plurality of input media data portions;
   a subsystem, implemented at least partially in hardware, that, based at least in part on the preferred rate of audio utterance and the plurality of rates of audio utterance, generates audio output media data comprising a plurality of output media data portions having at least two different output normal playback speeds but the same preferred rate of audio utterance.

16. The apparatus as recited in claim 15, wherein the one or more user identities are identified by an entity, external to a media device that generates the portion of audio output media data, based on the biometric data collected from the one or more users who correspond to the one or more user identities.

17. The apparatus as recited in claim 15, wherein the one or more user identities are identified by a media device, which generates the portion of audio output media data, based on the biometric data collected from the one or more users who correspond to the one or more user identities.

18. The apparatus as recited in claim 15, further comprising:
   a subsystem, implemented at least partially in hardware, that divides the input media data into the plurality of input media data portions.

19. The apparatus as recited in claim 15, wherein audible pitches respectively produced by the plurality of audio output media data portions rendered at the at least two or more different output normal playback speeds and produced by the plurality of input media data portions rendered at the input normal playback speed are perceptually same.

20. The apparatus as recited in claim 15, wherein at least one of the plurality of rates of audio utterance or the preferred rate of audio utterance relates to one of a rate of audio utterance for sentences, a rate of audio utterance for words, or a rate of audio utterance for syllables.

21. The apparatus of claim 15, wherein the plurality of rates of audio utterances for the plurality of input media data portions is received from a server.

\* \* \* \* \*